US009594562B2

(12) United States Patent
Muff et al.

(10) Patent No.: US 9,594,562 B2
(45) Date of Patent: *Mar. 14, 2017

(54) EXTENSIBLE EXECUTION UNIT INTERFACE ARCHITECTURE WITH MULTIPLE DECODE LOGIC AND MULTIPLE EXECUTION UNITS

(71) Applicant: International Business Machines Corporation, Armonk, NY (US)

(72) Inventors: Adam J. Muff, Issaquah, WA (US); Paul E. Schardt, Rochester, MN (US); Robert A. Shearer, Woodinville, WA (US); Matthew R. Tubbs, Issaqhah, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,799

(22) Filed: Apr. 11, 2016

(65) Prior Publication Data

US 2016/0224342 A1  Aug. 4, 2016

Related U.S. Application Data

(63) Continuation of application No. 13/793,443, filed on Mar. 11, 2013, now Pat. No. 9,342,309, which is a
(Continued)

(51) Int. Cl.
*G06F 9/30* (2006.01)
*G06F 9/38* (2006.01)

(52) U.S. Cl.
CPC ........ *G06F 9/3016* (2013.01); *G06F 9/30145* (2013.01); *G06F 9/384* (2013.01);
(Continued)

(58) Field of Classification Search
CPC ............................ G06F 9/3822; G06F 9/3885
See application file for complete search history.

(56) References Cited

U.S. PATENT DOCUMENTS

| 4,270,167 A | 5/1981 | Koehler et al. |
| 5,974,240 A * | 10/1999 | Chan ................... G06F 9/30094 |
| | | 712/215 |

(Continued)

OTHER PUBLICATIONS

Hennessy et al, "Computer Architecture—A Quantitative Approach," 3rd Ed., 2002, Morgan Kaufmann Publishers, pp. 290-293, 487-500, 723-728.*

(Continued)

*Primary Examiner* — Andrew Caldwell
*Assistant Examiner* — Yuqing Xiao
(74) *Attorney, Agent, or Firm* — Middleton Reutlinger

(57) ABSTRACT

Various circuit arrangements tightly couple together decode logic associated with multiple types of execution units and having varying priorities to enable instructions that are decoded as valid instructions for multiple types of execution units to be forwarded to a highest priority type of execution unit among the multiple types of execution units. Among other benefits, when an auxiliary execution unit is coupled to a general purpose processing core with the decode logic for the auxiliary execution unit tightly coupled with the decode logic for the general purpose processing core, the auxiliary execution unit may be used to effectively overlay new functionality for an existing instruction that is normally executed by the general purpose processing core, e.g., to patch a design flaw in the general purpose processing core or to provide improved performance for specialized applications.

20 Claims, 8 Drawing Sheets

Related U.S. Application Data continuation of application No. 13/766,508, filed on Feb. 13, 2013, now Pat. No. 9,329,870.

(52) U.S. Cl.
CPC .......... *G06F 9/3822* (2013.01); *G06F 9/3836* (2013.01); *G06F 9/3851* (2013.01); *G06F 9/3885* (2013.01)

(56) References Cited

U.S. PATENT DOCUMENTS

| | | |
|---|---|---|
| 6,249,855 B1 | 6/2001 | Farrell et al. |
| 6,289,434 B1 | 9/2001 | Roy |
| 7,007,154 B2 | 2/2006 | Moyer et al. |
| 7,243,212 B1 | 7/2007 | Purcell |
| 7,263,599 B2 | 8/2007 | Norden et al. |
| 7,818,162 B2 | 10/2010 | Sugawara |
| 2004/0088524 A1 | 5/2004 | Chauvel et al. |
| 2008/0114970 A1* | 5/2008 | Colavin .............. G06F 9/30076 712/226 |
| 2008/0162891 A1 | 7/2008 | Pittman et al. |
| 2008/0270759 A1 | 10/2008 | Im |
| 2014/0229708 A1 | 8/2014 | Muff et al. |
| 2014/0229713 A1 | 8/2014 | Muff et al. |

OTHER PUBLICATIONS

Shen et al., "Processor Design," Beta ed., 2002, McGraw-Hill Companies, Inc., pp. 4-5.*
Comparing Floating Point and Fixed-Point Implementation on ADI Blackfan Processors with LabVIEW. "pp. 1-4" Oct. 19, 2012.
Wikipedia, "Register renaming", Dec. 17, 2012, "pp. 1-8".
Wikipedia, "Hardware description language", Jan. 29, 2013, "pp. 1-9".
Sima, "The Design Space of Register Renaming Techniques", Sep. 2000, Micro, IEEE, vol. 20 Issues 5, pp. 70-83.
U.S. Patent and Trademark Office, Office Action issued in related U.S. Appl. No. 13/766,508 dated Jun. 29, 2015.
U.S. Patent and Trademark Office, Final Office Action issued in related U.S. Appl. No. 13/766,508 dated Nov. 9, 2015.
U.S. Patent and Trademark Office, Advisor Action issued in related U.S. Appl. No. 13/766,508 dated Jan. 13, 2016.
U.S. Patent and Trademark Office, Notice of Allowance issued in related U.S. Appl. No. 13/766,508 dated Feb. 10, 2016.
U.S. Patent and Trademark Office, Office Action issued in related U.S. Appl. No. 13/793,443 dated Jun. 19, 2015.
U.S. Patent and Trademark Office, Final Office Action issued in related U.S. Appl. No. 13/793,443 dated Nov. 2, 2015.
U.S. Patent and Trademark Office, Advisory Action issued in related U.S. Appl. No. 13/793,443 dated Jan. 15, 2016.
U.S. Patent and Trademark Office, Notice of Allowance issued in related U.S. Appl. No. 13/793,443 dated Feb. 25, 2016.
U.S. Patent and Trademark Office, Office Action issued in related U.S. Appl. No. 15/095,780 dated Jul. 5, 2016.
U.S. Patent and Trademark Office, Final Office Action issued in related U.S. Appl. No. 15/095,780 dated Nov. 2, 2016.

* cited by examiner

| Decode Valid? | | Action |
|---|---|---|
| XU1 | XU0 | |
| N | N | Illegal Instruction Interrupt |
| N | Y | Execute With XU0 |
| Y | N | Execute With XU1 |
| Y | Y | Execute With XU1 |

FIG. 6

| Decode Valid? | | | Action |
|---|---|---|---|
| XU2 | XU1 | XU0 | |
| N | N | N | Illegal Instruction Interrupt |
| N | N | Y | Execute With XU0 |
| N | Y | N | Execute With XU1 |
| N | Y | Y | Execute With XU1 |
| Y | N | N | Execute With XU2 |
| Y | N | Y | Execute With XU2 |
| Y | Y | N | Execute With XU2 |
| Y | Y | Y | Execute With XU2 |

FIG. 7

EXTENSIBLE EXECUTION UNIT INTERFACE ARCHITECTURE WITH MULTIPLE DECODE LOGIC AND MULTIPLE EXECUTION UNITS

FIELD OF THE INVENTION

The invention is generally related to data processing, and in particular to processor architectures and execution units incorporated therein.

BACKGROUND OF THE INVENTION

Computers and other programmable electronic devices continue to be integrated into every aspect of society. Whereas computers once occupied entire rooms, computers and the integrated circuit devices, or chips, that power such computers have now been miniaturized and commoditized to such an extent that they can be found in even the most mundane of products and devices.

Programmable chips such as microprocessors, microcontrollers, Application Specific Integrated Circuits (ASIC's) and the like continue to increase in complexity and power while costs, power consumption and feature sizes decrease. Whereas computers once incorporated separate chips for processors, graphics controllers, coprocessors, memory controllers, and other chipset logic, oftentimes all of these types of functional units are integrated into a single programmable chip. Moreover, once a particular chip design has been developed, tested and verified, manufacturing costs are often comparatively low on a per unit basis.

A significant portion of the effort and expense associated with bringing a programmable chip to market are therefore devoted to the initial design, testing and verification of a programmable chip. For this reason, design reuse is employed whenever possible so that portions of a programmable chip, such as particular processor core designs, functional units, and other logic blocks, which have previously been designed, tested and verified, do not need to be recreated from scratch.

Even with design reuse, however, the integration of multiple design components into a common design frequently requires some custom logic to be designed and tested to ensure that the components will correctly operate with one another once integrated onto the same programmable chip. For example, modern microprocessors typically include functional units such as issue or instruction units, load/store units, execution units, memory controllers, graphics controllers, cache and other on-board memories, etc., and development of such microprocessors often requires substantial development, testing and verification efforts to ensure that all of the functional units operate in an intended manner.

In addition, microprocessor designs may be utilized for different types of workloads, and it has been found that different types of workloads are often handled most efficiently using different types of instructions. General purpose office software, for example, typically relies primarily on fixed point instructions, while collision detection physics algorithms typically used in computer gaming are most efficiently performed using floating point scalar instructions. High speed 3D graphics algorithms like rasterization are most efficiently performed using vector fixed point instructions while having very little need for double precision vector floating point instructions. Nonetheless, most workloads also usually require some basic instructions at least for basic control flow, e.g., instructions for performing branches, loads/stores, and fixed point math.

As a result, many microprocessor designs rely on a basic design that can be extended through the use of different functional units to provide various designs that are optimized for different applications. For example, it may be desirable to extend the functionality of a microprocessor by integrating multiple processing cores together to facilitate parallel processing, as well as integrating various execution units within a processing core to optimize the core to handle certain types of workloads. For example, while a basic microprocessor design often includes a processing core with an issue or instruction unit that issues instructions to an execution unit referred to as a fixed point unit, integer unit or arithmetic logic unit that handles integer operations, additional execution units, e.g., floating point execution units, graphics engines, physics engines, encryption engines, and the like may be incorporated into the basic design to provide an application specific design that is optimized for certain applications.

With the ability to combine different types of execution units in various processing cores and programmable chips, significant design flexibility is provided for developing application-specific hardware. On the other hand, given the substantial up-front efforts still required to design, test and verify multiple functional units integrated into application-specific programmable chips, there are still substantial costs associated with bringing application-specific programmable chips to market.

Therefore, a significant need continues to exist in the art for a manner of facilitating the development of application-specific programmable chips and electronic devices incorporating the same.

SUMMARY OF THE INVENTION

The invention addresses these and other problems associated with the prior art by providing a method and circuit arrangement that utilize an extensible execution unit interface architecture that tightly couples together decode logic associated with multiple types of execution units and having varying priorities to enable instructions that are decoded as valid instructions for multiple types of execution units to be forwarded to a highest priority type of execution unit among the multiple types of execution units. For example, decode logic respectively associated with first and second types of execution units may be coupled together and configured to concurrently receive and decode the same instructions in an instruction stream. Whenever an instruction is decoded as a valid instruction for only one of the types of execution units, the instruction may be forwarded to the corresponding type of execution unit. However, when the instruction is decoded as a valid instruction for both types of execution units, the relative priorities of the different types of execution units may be used to select a highest priority type of execution unit to execute the instruction.

Among other benefits, when an auxiliary execution unit is coupled to a general purpose processing core with the decode logic for the auxiliary execution unit tightly coupled with the decode logic for the general purpose processing core, the auxiliary execution unit may be used to effectively overlay new functionality for an existing instruction that is normally executed by the general purpose processing core. Thus, for example, in a design flaw exists in the general purpose processing core that causes a sub-optimal execution of a particular instruction, an auxiliary execution unit may be designed to correct the design flaw, and the decode logic for the auxiliary execution unit may be configured to decode that instruction as a valid instruction, such that whenever the instruction is decoded, the auxiliary execution unit will execute the instruction in lieu of the general purpose processing core. Also, in specialized applications where higher performance is desired for certain instructions, a specialized auxiliary execution unit may be designed to optimize execution of those instructions, and often avoiding the need to modify the general purpose processing core to accommodate the performance concerns of the specialized application.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 6 is a priority table for use in the IP block of FIG. 5.

FIG. 7 is an alternate priority table to that of FIG. 6, and defining priorities for three types of execution units.

DETAILED DESCRIPTION

Embodiments consistent with the invention implement an extensible execution unit interface architecture that tightly couples together decode logic associated with multiple types of execution units and having varying priorities to enable instructions that are decoded as valid instructions for multiple types of execution units to be forwarded to a highest priority type of execution unit among the multiple types of execution units. In the embodiments discussed hereinafter, for example, decode logic respectively associated with first and second types of execution units may be coupled together and configured to concurrently receive and decode the same instructions in an instruction stream. Whenever an instruction is decoded as a valid instruction for only one of the types of execution units, the instruction may be forwarded to the corresponding type of execution unit. However, when the instruction is decoded as a valid instruction for both types of execution units, the relative priorities of the different types of execution units may be used to select a highest priority type of execution unit to execute the instruction.

An extensible execution unit interface architecture may be implemented, for example, in a general purpose processing unit, which within the context of the invention may include practically any type of processing unit, e.g., as disposed in an IP block, a processor chip, a processor core, etc., and capable of executing instructions to handle general purpose workloads. While a general purpose processing unit may include various components, execution units or accelerators that optimize or accelerate particular types of workloads, e.g., image processing, graphics, scientific workloads, transaction processing, etc., a general purpose processing unit is otherwise capable of handling multiple types of workloads, even if it does so sub-optimally as compared to a more specialized processing unit.

In addition, an extensible execution unit interface architecture may be suitable for integrating an auxiliary execution unit (AXU) with a general purpose processing unit, e.g., to address a design flaw or to augment the capabilities of the general purpose processing unit. In this regard, an auxiliary execution unit may be configured as a scalar or vector fixed point execution unit (XU), a scalar or vector floating point execution unit (FPU), or various types of accelerators or specialized execution units (e.g., encryption/decryption engines, DMA engines, compression/decompression engines, physics engines, graphics processors, coprocessors, etc.).

Other variations and modifications will be apparent to one of ordinary skill in the art. Therefore, the invention is not limited to the specific implementations discussed herein.

Hardware and Software Environment

Figure 1:
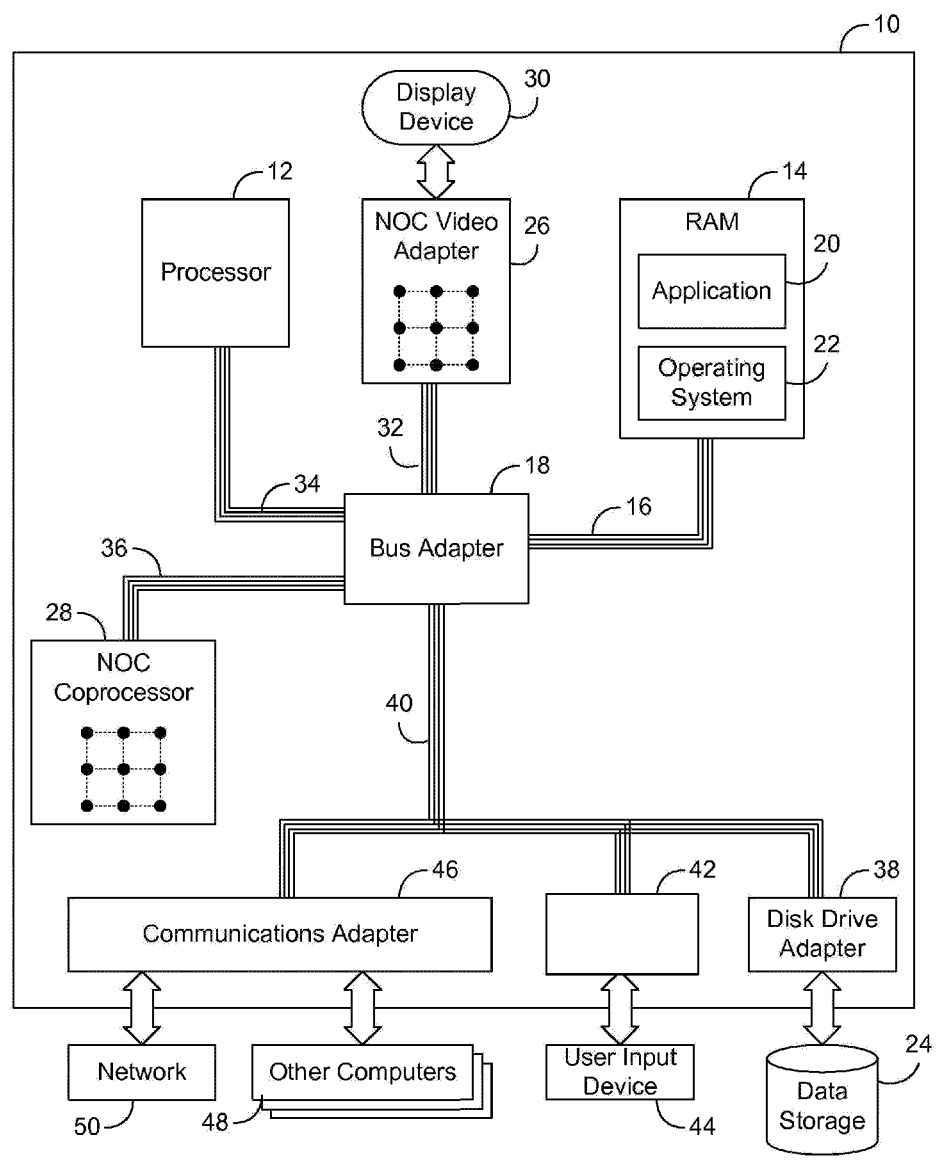
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
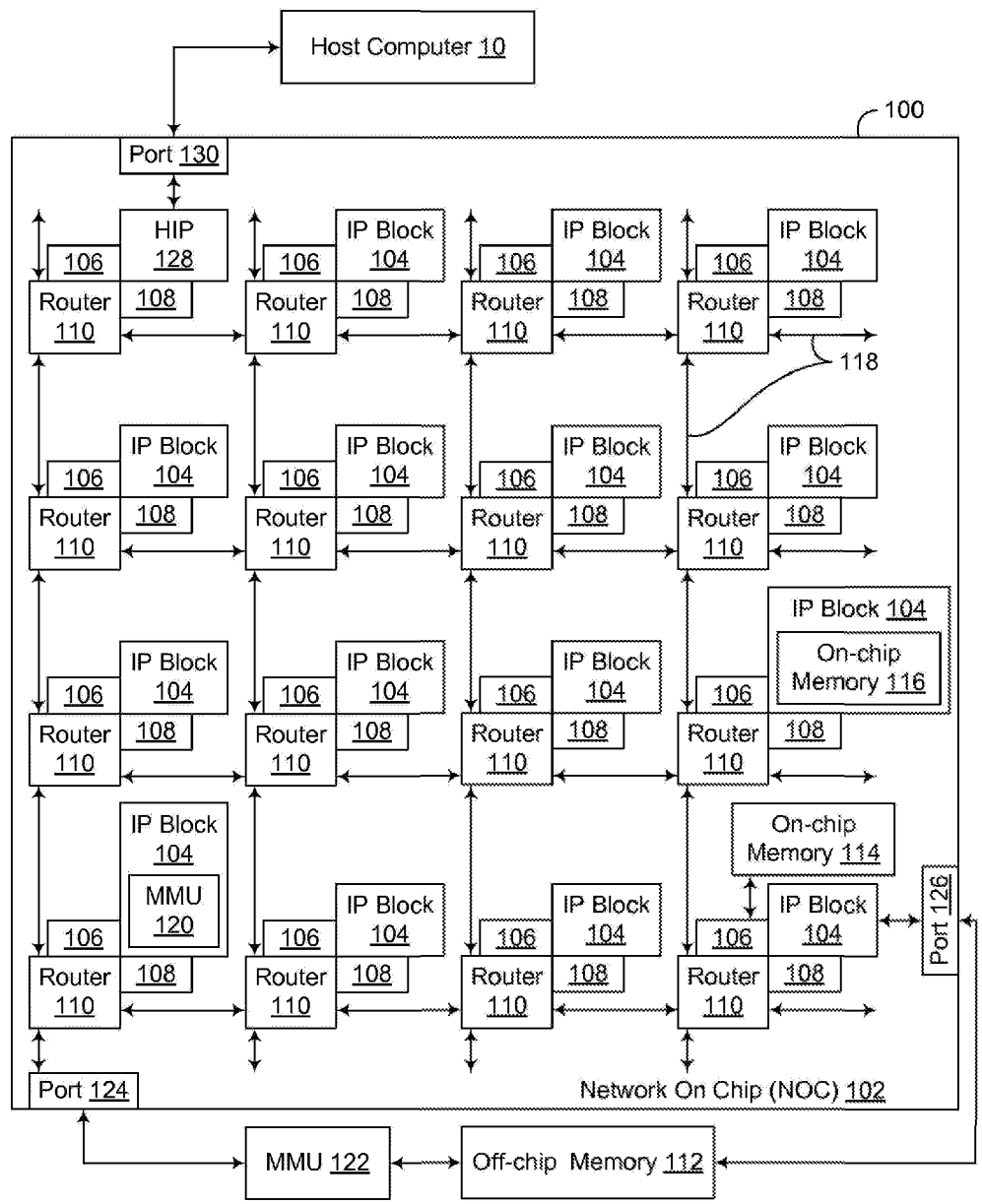
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may use different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
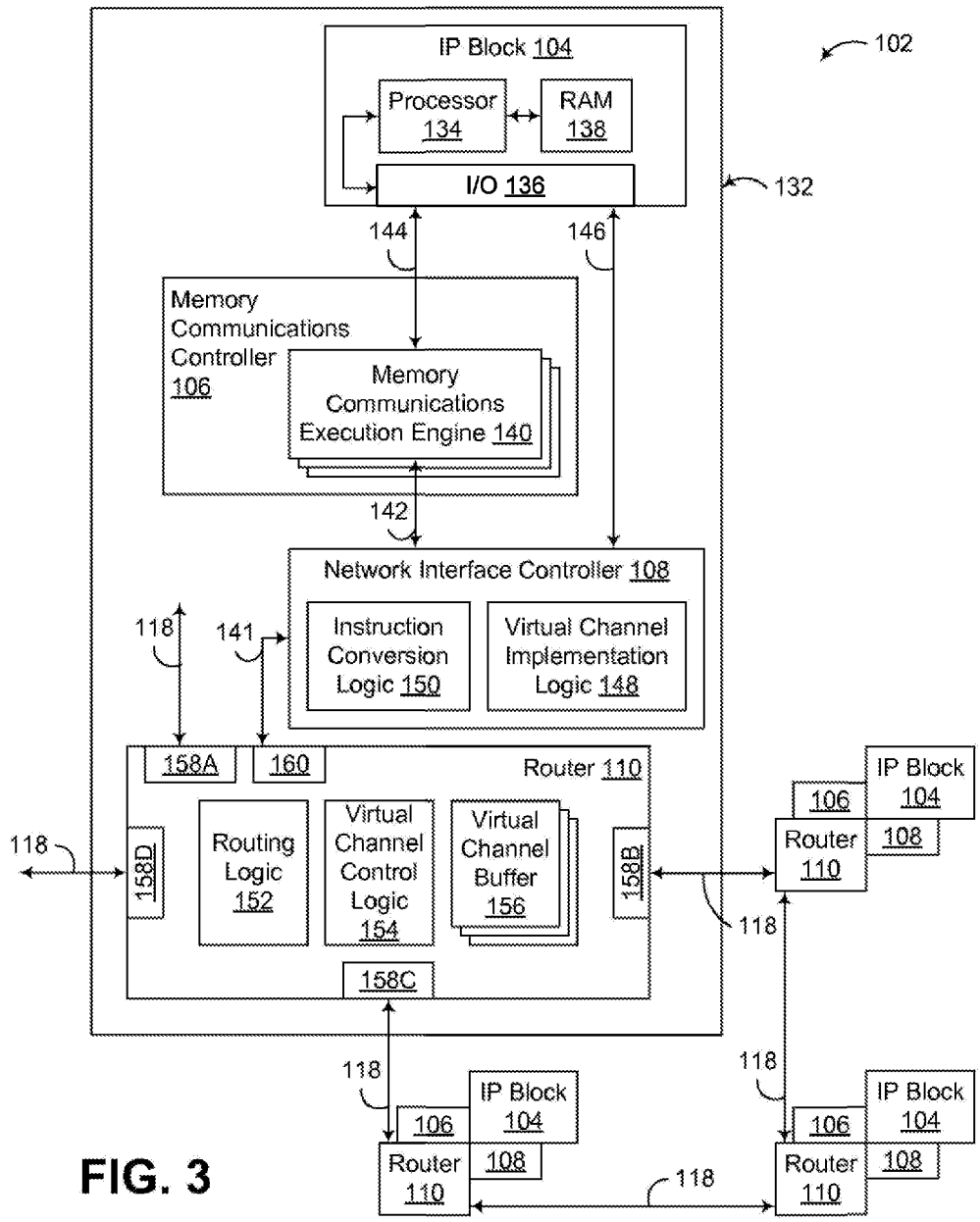
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
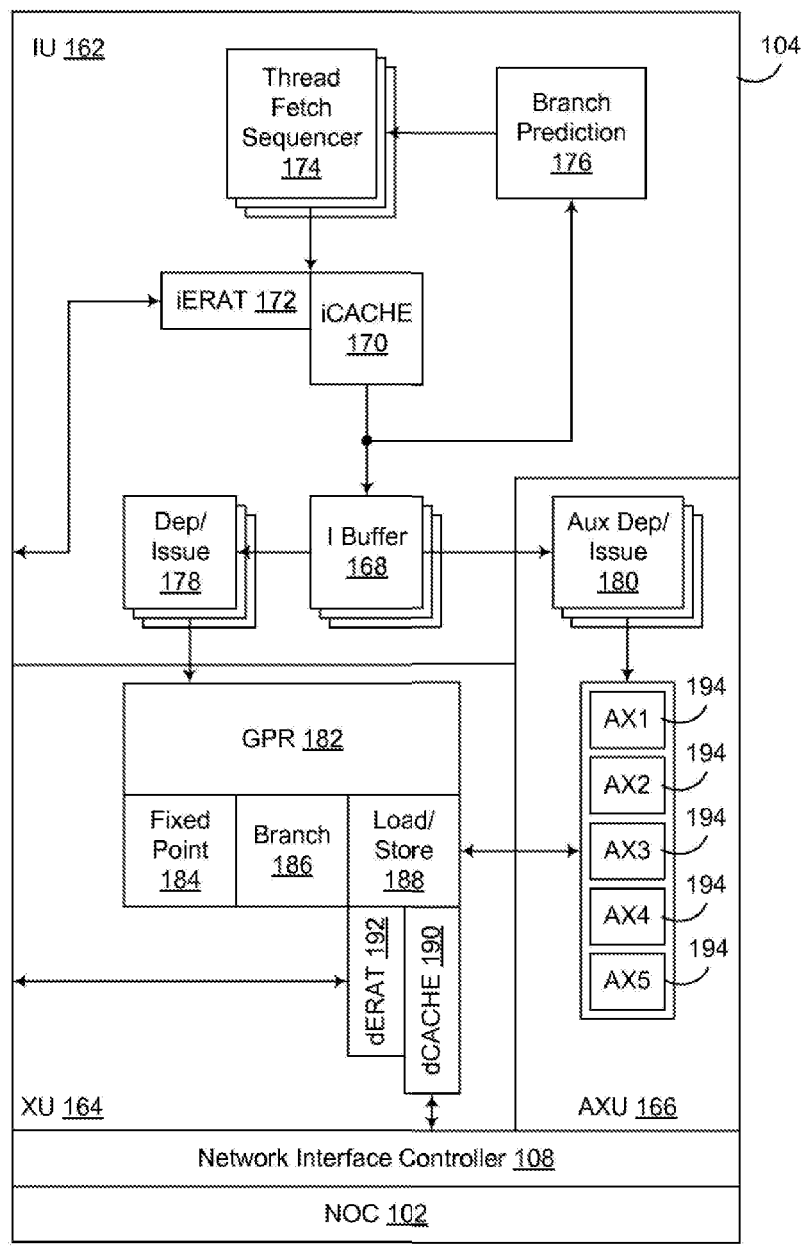
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Extensible Execution Unit Interface Architecture

Embodiments consistent with the invention utilize an extensible execution unit interface architecture that tightly couples the decode logic of multiple execution units in a processing unit and supports the ability for one execution to overlay one or more instructions of another execution unit. In some embodiments, for example, priorities (which may be hard-coded into a design) are assigned to different execution units and at least a portion of the instructions in an instruction stream are concurrently forwarded to decode logic associated with multiple execution units such that whenever an instruction is decoded as being a valid instruction for multiple execution units, the instruction will be forwarded along for execution only by the execution unit having the highest priority.

In the embodiments discussed hereinafter, for example, an extensible execution unit interface architecture may be tightly coupled with at least the decode, rename, execute and commit stages of a processing unit to maintain performance and encourage design reuse to drive down cost. The interface may be designed to be able to be used by a wide variety of instruction architecture additions, such as scalar floating point, vector fixed point, vector floating point, etc. The interface also allows an auxiliary execution unit (hereafter AXU) to "overlay" an existing instruction that would normally be executed on the general purpose side of a processing unit, thus allowing, for example, a designer, or even a customer, to replace an existing instruction with its own, allowing greater flexibility. As will also become more apparent below, overlaying an instruction may also be used to provide enhanced performance for specialized applications, as well as to "patch" instructions that may be executed in a sub-optimal manner in other execution units.

Figure 5:
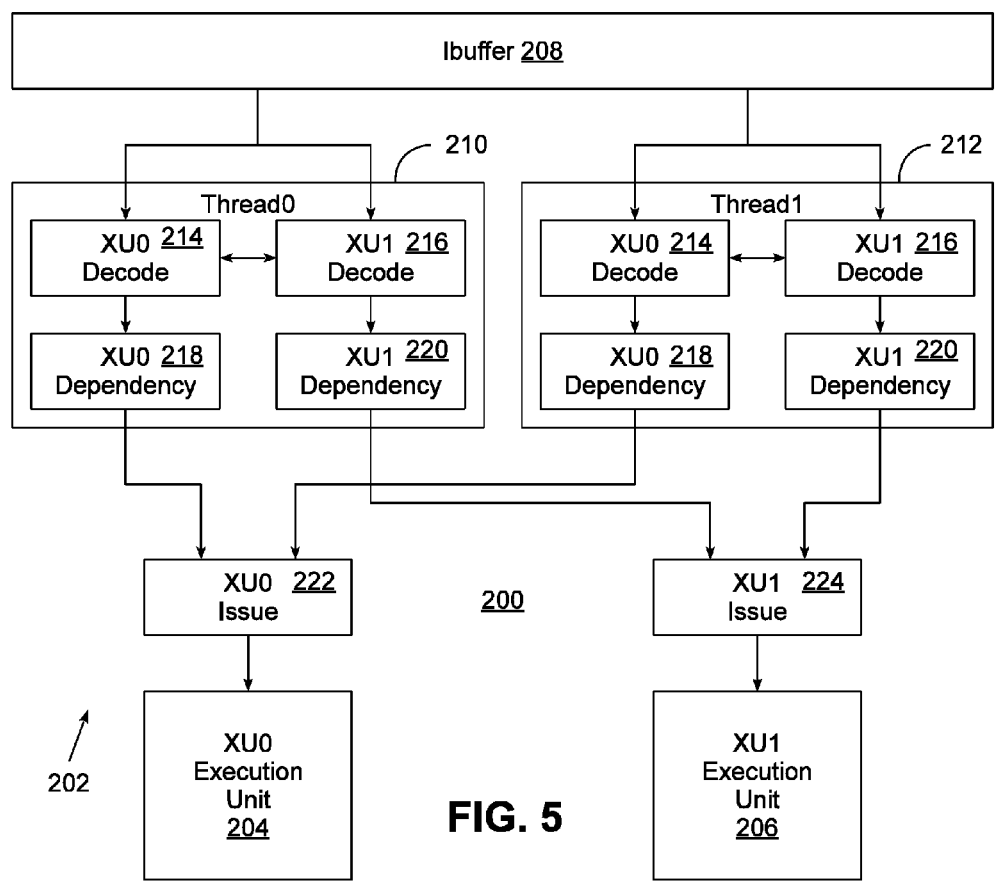
FIG. 5 is a block diagram illustrating an exemplary implementation of an IP block from the NOC of FIG. 2, and configured to implement an extensible execution unit interface architecture consistent with the invention.

By way of example, FIG. 5 illustrates a portion of an example processing unit 200, which may be implemented, for example, as an IP block from the computer of FIGS. 1-4. Processing unit 200 includes instruction logic 202 implementing an extensible execution unit interface architecture and configured to supply instructions to one or more execution units, e.g., execution units 204, 206, which are also designated as XU0 and XU1. Each execution unit may be implemented using any type of execution unit, e.g., a scalar or vector fixed point execution unit, a scalar or vector floating point execution unit, various types of accelerators or specialized execution units (e.g., encryption/decryption engines, DMA engines, compression/decompression engines, physics engines, graphics processors, coprocessors, etc.) Moreover, multiple instances of an execution type may be supported in a given processing unit design, such that, for example, instructions may be forwarded to different execution units of a given type of execution unit to increase overall throughput.

In addition, within the context of the invention, execution units sharing the same "type" are capable of executing the same instructions such that a valid instruction decoded by the decode logic can be executed by all execution units of that type. The execution units of the same type need not be configured identically to one another from either a functionality or hardware perspective in some embodiments; however, they typically are configured such that they are all capable of receiving instructions from the same decode logic.

In this example embodiment, two-way multithreading is supported, and as such up to two instructions are provided per cycle to a pair of threads 210, 212 (also designated as Thread0 and Thread1). For each thread 210, 212, one or more instruction processing stages are included, with only the decode and dependency stages illustrated in FIG. 5 to simplify the discussion.

To implement an extensible execution unit interface architecture consistent with the invention, the decode stage of each thread 210, 212 includes decode logic 214, 216 respectively associated with each type of execution unit (i.e., execution units XU0 and XU1). The dependency stage of each thread 210, 212 similarly includes dependency logic 218, 220 respectively associated with each type of execution unit. In addition, decode logic 214, 216 are in communication with one another to enable one or both of decode logic 214, 216 to assert an invalidate signal to the other decode logic 214, 216 to invalidate the instruction in the other decode logic so that the instruction is not executed by an execution unit associated with the other decode logic. Thread1 212 includes similar decode logic 214, 216 and dependency logic 218, 220 as Thread0 210 to process instructions associated with Thread1.

Each execution unit 204, 206 is coupled to an associated issue unit 222, 224 and each issue unit 222, 224 is configured to receive instructions for the associated execution unit 204, 206 from the dependency logic 218, 220 in each thread 210, 212 and associated with the respective execution unit 204, 206. As such, issue units 222 arbitrate between threads 210, 212 and pass instructions released by the dependency logic from each thread to the associated execution units for execution thereby.

Processing unit 200 includes an instruction set architecture (ISA) that defines the format of each instruction capable of being executed by the processing unit. However, in many embodiments, specific execution units are only capable of executing a subset of the instructions defined in the ISA (e.g., a floating point unit may only handle floating point instructions), such that any instruction that is not capable of being executed by a particular execution unit will be decoded as an invalid instruction. Therefore, in the illustrated embodiment, instructions associated with a particular thread 210, 212 are concurrently forwarded to decode logic 214 and 216 and independently decoded by each such decode logic, such that for any instruction that is specific to a particular execution unit will only be decoded as a valid instruction by the decode logic for that execution unit. In addition, however, for instructions that are capable of being executed by both execution units, the relative priorities of the execution units are used to control which execution unit will execute the instruction.

FIG. 6, for example, illustrates a state table defining the actions that occur based upon how each decode logic 214, 216 decodes a particular instruction, and in the case where execution unit 206 (XU1) is assigned a higher priority than execution unit 204 (XU0). Where only one decode logic 214, 216 decodes an instruction as a valid instruction, the associated execution unit 204, 206 will execute the instruction. However, where both decode logic 214, 216 decode an instruction as valid, the instruction will be executed by execution unit 206 (XU1) based upon its higher priority. In addition, in the case where neither decode logic 214, 216 decodes the instruction as a valid instruction, an illegal instruction program interrupt is signaled, which typically results in the instruction being handled in software.

Priorities may be assigned in a number of manners consistent with the invention. For example, priorities may be configurable at runtime via a special purpose register or other software-based control. Priorities may also be configurable based on a fuse, a control signal or other run-time based mechanism. In the illustrated embodiments, however, priorities are typically hard-coded and static in nature and implemented directly within the design of the processing unit. For example, in one embodiment decode logic 216 associated with execution unit 206 may be configured to send an invalidate signal to decode logic 214 in response to decoding a valid instruction, such that decode logic 214 invalidates the instruction regardless of whether the instruction is decoded as valid or invalid by decode logic 214. It will be appreciated, however, that other manners of implementing a priority mechanism to control which execution unit executes an instruction that is decoded as a valid instruction by multiple decode logic may be used, and that such alternate implementations would be apparent to one of ordinary skill in the art having the benefit of the instant disclosure.

It will be appreciated that the aforementioned priority mechanism may also be extended to handle processing unit designs with more than two types of execution units. FIG. 7, for example, illustrates a state table for use with a processing unit having three types of execution units XU0, XU1 and XU2, where execution unit XU2 has the highest priority, followed by execution unit XU1 and then execution unit XU0. As shown in the table, whenever the decode logic associated with execution unit XU2 decodes a valid instruction, the instruction will always be executed by that execution unit, but where execution unit XU2 decodes an instruction as an invalid instruction, execution unit XU1 will still be prioritized over execution unit XU0 in the same manner as discussed above in connection with FIG. 6.

Figure 8:
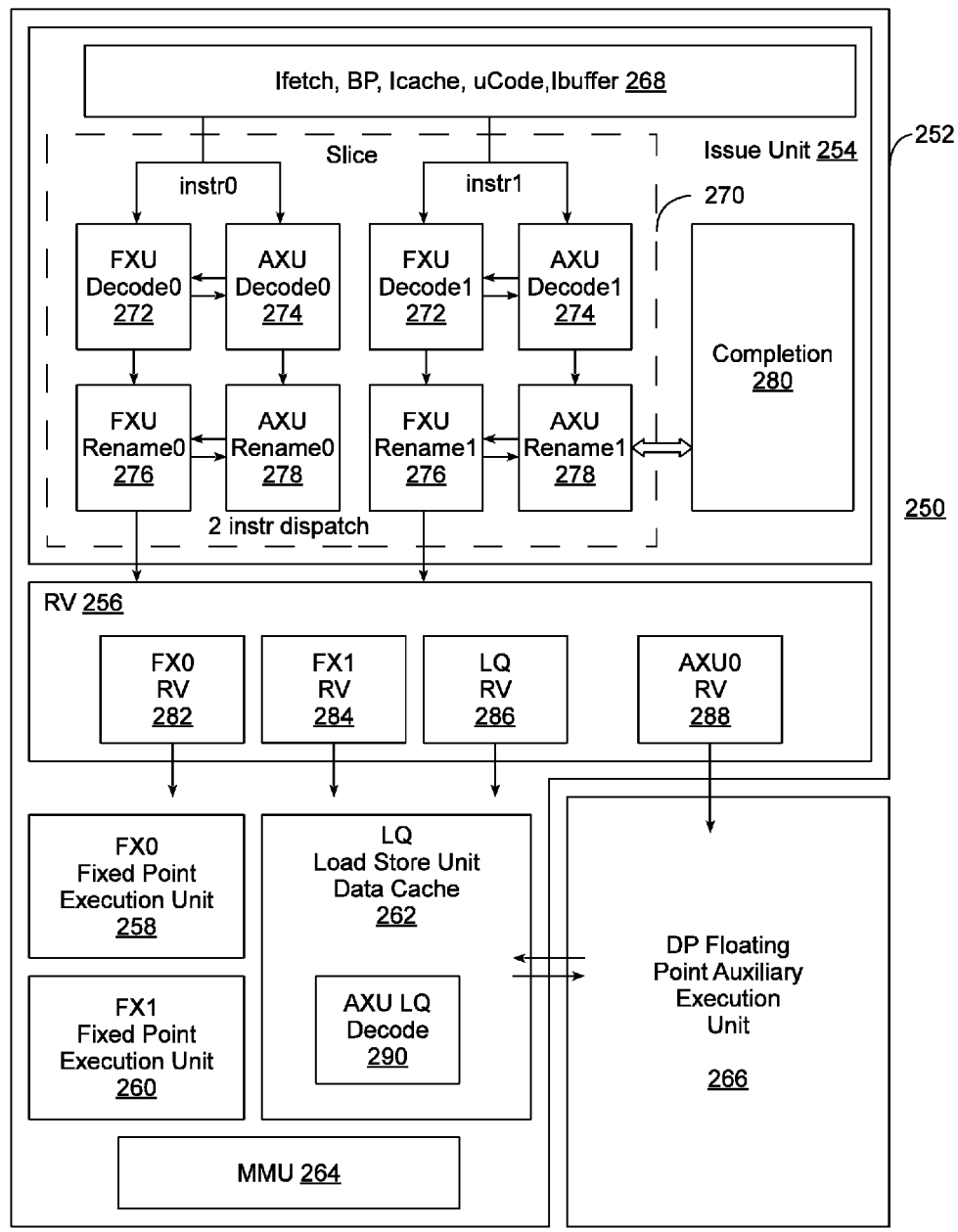
FIG. 8 is a block diagram illustrating a processing unit design integrating a general purpose processing core with an auxiliary execution unit using an extensible execution unit interface architecture consistent with the invention.

To further illustrate various applications of an extensible execution unit interface architecture consistent with the invention, FIG. 8 next illustrates a processing unit 250 incorporating a general core 252 including an issue unit 254, reservation unit 256, first and second fixed point execution units 258, 260 (FX0, FX1), a load store unit 262 (LQ, with data cache) and memory management unit 264. In this example, general core 250 is a general purpose processing core that is capable of being integrated with various auxiliary execution units (AXU's) to create a specialized application-specific processing unit. For example, in the application shown in FIG. 8, general core 250 may be integrated with a scalar double precision floating point AXU 266 to provide enhanced floating point capabilities for the processing unit.

Issue unit 254 includes various instruction fetching components collectively illustrated in block 268, e.g., an instruction fetch unit, branch prediction logic, an instruction cache, a microcode unit and an instruction buffer. Multithreaded instruction logic 270 receives up to two instructions (instr0, instr1) for two threads per cycle, and each instruction is passed to paired decode logic 272, 274 respectively associated with a fixed point execution unit type (FXU) and an auxiliary execution unit type (AXU). Paired rename logic 276, 278 respectively associated with the FXU and AXU execution unit types receive instructions from the decode logic 272, 274 and apply renaming operations to the instructions to map the operands to registers in the register files for the associated execution units based upon the respective register file architectures for the execution units. Completion logic 280 is used to coordinate the issuance of instructions among the multiple threads, and to retire instructions upon completion of execution.

Reservation logic 282 includes reservation stations 282, 284, 286 and 288 respectively associated with FX0 execution unit 258, FX1 execution unit 260, load store unit 262 and AXU 266, which respectively queue instructions for execution by the associated execution unit.

In operation, two instructions, instr0 and instr1, are concurrently forwarded to the FXU decoder logic 272 and AXU decoder logic 274. The FXU decoder logic typically decodes all general purpose instructions supported by the processing unit architecture, such as branches, fixed point math, fixed point loads and stores, cache management instructions, etc. The AXU decoder logic unit is primarily directed to execute double precision scalar floating point instructions, but may be configured to support one or more of the instructions also supported by FXU decoder logic 272.

If FXU decoder logic 272 decodes an instruction as one of its own, and AXU decoder logic 274 does not, the instruction is considered a valid FXU instruction and is executed on either the FX0 or FX1 fixed point execution units 258, 260. If AXU decoder logic 274 decodes an instruction as one of its own and FXU decoder logic 272 doesn't, the instruction is considered a valid AXU instruction and is executed by AXU 266. It should be noted that the interface may support multiple AXU's that may be identical to one another such that instructions may be issued to the first available AXU, or may be different to support different instruction set architectures.

If both AXU decoder logic 274 and FXU decoder logic 272 decode the instruction as a valid instruction, AXU 266 will execute the instruction so that, in effect, AXU 266 replaces the functionality of an existing instruction. If no decode logic decodes the instruction as its own, the instruction is considered to be illegal and an illegal instruction program interrupt occurs.

Once the two instructions for the two threads are decoded, the instructions proceed to rename logic 276, 278 in a rename stage, which translates the architected register addresses identified in the instructions to corresponding physical register addresses. This allows each instruction to operate on a larger pool of physical addresses, allowing more instructions to be issued and executed out of order, which improves performance. In addition, if a particular AXU implementation does not need to rename its registers, or doing so would actually hamper performance, the AXU rename logic may simply set the physical register number to the architected register number, effectively bypassing any register renaming. Each rename logic 276, 278 also interfaces with completion logic 280, as once instructions are completed, the associated rename physical registers are freed up if not needed. After the physical addresses are determined by rename logic 276, 278, the instructions proceed to the reservation stations 282-288, which track dependencies between instructions, and holds off on the issuance of dependent instructions until any required data is ready. In many implementations, instructions may be forwarded to the associated execution units in an out of order fashion due to outstanding dependencies.

Various additional logic may be utilized in processing unit 250 to support an extensible execution unit interface architecture. For example, shared registers, such as the condition register (CR), which are shared between execution units often and require high performance, may also be renamed to an address that is in a bigger pool than the architected size, such that AXU instructions that alter the CR don't necessarily hamper performance for FXU instructions. Further, to support multithreading, a thread ID signal may be provided with each instruction. If a particular AXU supports fewer threads than what exists in the microprocessor for the FXU, and the AXU is sent a thread id that is higher than what it supports, it will cause a Unimplemented instruction interrupt. In addition, for the purpose of loads and stores, separate AXU LQ decode logic 290 may be used to enable the AXU to provide the load store unit (LQ) 262 with a set of signals that describe a load or store in generic terms, such as how many bytes to load/store, how to calculate the memory address, the endian-ness, etc., such that LQ 262 will return load data to the AXU register file and bypass, and receive store data from the AXU register file.

In addition, in some embodiments, it may be desirable to utilize an interface to an AXU that supports indefinite or indeterminate latencies, such that an AXU is required to return a signal to issue unit 254 with an instruction tag and thread ID when it has finished executing a particular instruction. As such, while instructions may be concurrently forwarded to multiple decode logic associated with different execution unit types, it is not always the case that the respective decode logic decode an instruction precisely simultaneously, or that other stages of the instruction processing pipeline occur simultaneously for every execution unit.

Figure 9:
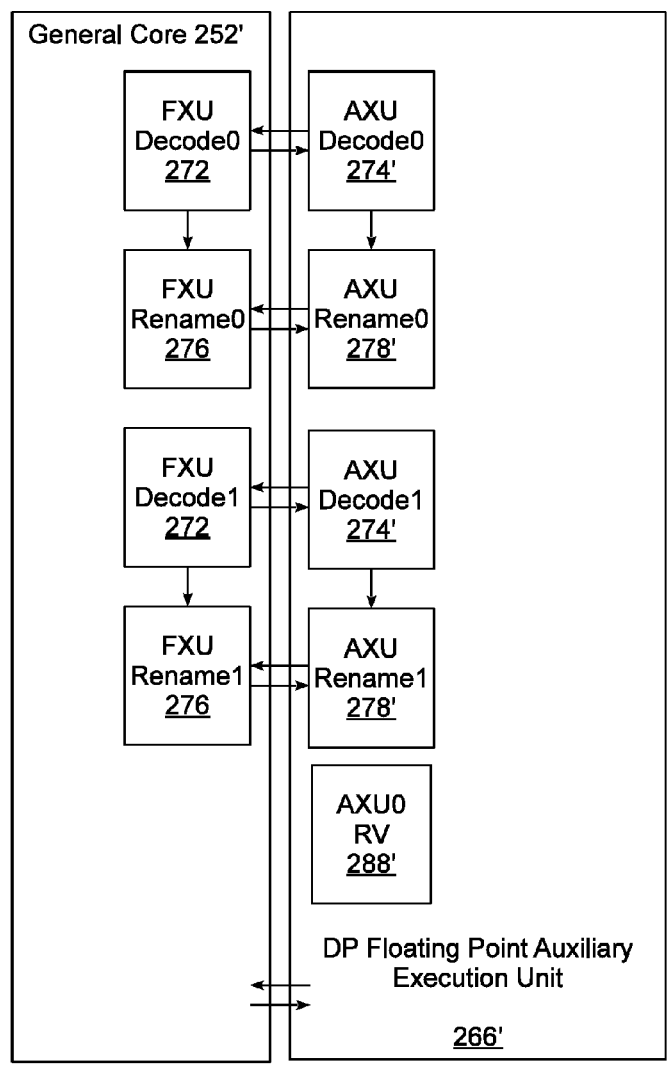
FIG. 9 is a block diagram illustrating another processing unit design integrating a general purpose processing core with an auxiliary execution unit using an extensible execution unit interface architecture consistent with the invention.

An extensible execution unit interface architecture consistent with the invention provides a number of benefits, particularly in the development of application specific hardware designs. For example, it will be appreciated that while AXU decode logic 274, AXU rename logic 278 and other supporting circuitry for the AXU are illustrated within general core 252, such logic in many cases may be physically disposed outside of the core and disposed within AXU 266 or elsewhere on an integrated circuit. Particularly in the case where general core 252 is a designed, verified and tested core, it may be desirable to simply provide an interface to AXU decode logic 274 and any other AXU-related logic such that such logic may be added to an application-specific processing unit design without having to modify the design of the general core, and thereby enabling the general core to be used in a wide variety of applications. As such, a general core may be integrated with additional functionality simply by adding an execution unit and associated decode and other instruction logic to a processing unit design, and interfaced with appropriate interfaces in the general core. As an example, FIG. 9 illustrates a processing unit 250' that includes a general core 252' that is similar to general core 252 of processing unit 250 of FIG. 8, as well as an AXU 266' that is similar to AXU 266 of FIG. 8. However, while general core 252' retains the same FXU decode and FXU rename logic 272, 276 (as well as reservation logic 282-286, not shown in FIG. 9), the AXU decode logic, AXU rename logic, and AXU reservation logic are instead disposed outside of general core 252' and within AXU 266', as illustrated at 274', 278' and 288'.

One benefit of such a configuration is that different parties can combine their respective intellectual property without the need to disclose such intellectual property to one another. A party wishing to incorporate their own proprietary accelerator functionality, for example, could rely on another party's general core for the remainder of the required functionality, and thereby limit their custom design, testing and verification to the AXU, often saving considerable cost and effort associated with development of an application specific hardware design. In addition, if one party needs to limit access to their confidential intellectual property, e.g., due to its proprietary nature, or due to government confidential or classified designs, that party may do so without having to disclose such confidential information to the other party.

Furthermore, the illustrated embodiments allow for higher performance and/or greater flexibility and quick design turnaround and the flexibility for a chip designer or customer to redefine an existing instruction in an established instruction set architecture. As noted above, the redefinition may be used to provide enhanced performance for an instruction through the use of a specialized execution unit, or may be used to correct for a design flaw in core that results in sub-optimal execution of the instruction in the core.

It will be appreciated that a wide variety of alternate configurations may be utilized to that illustrated in FIGS. 5 and 8. For example, various alternative issue logic configurations may be used, e.g., where various components or stages are combined for different execution units or threads, rather than being implemented separately, or where additional and/or alternative components or stages are used. Different memory architectures and cache structures may be used in other embodiments, as may different numbers and combinations of execution units.

Various additional modifications may be made to the disclosed embodiments without departing from the spirit and scope of the invention. Therefore, the invention lies in the claims hereinafter appended.

What is claimed is:

1. A circuit arrangement, comprising:
    first decode logic associated with a first type of execution unit and configured to receive an instruction and decode the instruction; and
    second decode logic associated with a second type of execution unit and configured to receive the instruction and decode the instruction, wherein the instruction is concurrently forwarded to the first and second decode logic;
    wherein the second decode logic is disposed within a designed, verified and tested core, wherein the first decode logic is interfaced with the second decode logic, wherein the first decode logic has a higher priority than the second decode logic such that if the first and second decode logic respectively decode the instruction as a valid instruction for the first and second types of execution unit, the instruction is executed by a first execution unit of the first type of execution unit rather than by a second execution unit of the second type of execution unit, wherein the second execution unit is disposed within the designed, verified and tested core, wherein the first execution unit is disposed external to the designed, verified and tested core, wherein the designed, verified and tested core, the first decode logic and the first execution unit are disposed in an application specific hardware design, wherein the circuit arrangement further comprises first and second rename logic respectively associated with the first and second decode logic and respectively configured to apply different renaming operations to the instruction.

2. The circuit arrangement of claim 1, wherein the first and second decode logic are configured such that:
    in response to the first decode logic decoding the instruction as a valid instruction for the first type of execution unit and the second decode logic decoding the instruction as an invalid instruction for the second type of execution unit, the instruction is forwarded to the first execution unit for execution thereby;
    in response to the first decode logic decoding the instruction as an invalid instruction for the first type of execution unit and the second decode logic decoding the instruction as a valid instruction for the second type of execution unit, the instruction is forwarded to the second execution unit for execution thereby; and
    in response to the first decode logic decoding the instruction as a valid instruction for the first type of execution unit and the second decode logic decoding the instruction as a valid instruction for the second type of execution unit, the instruction is forwarded to the first execution unit for execution thereby.

3. The circuit arrangement of claim 2, wherein the first and second decode logic are further configured such that in response to the first decode logic decoding the instruction as an invalid instruction for the first type of execution unit and the second decode logic decoding the instruction as an invalid instruction for the second type of execution unit, an interrupt is signaled.

4. The circuit arrangement of claim 3, wherein the interrupt is an illegal instruction program interrupt.

5. The circuit arrangement of claim 1, wherein the first decode logic is configured to assert an invalidate signal to the second decode logic in response to decoding the instruction as a valid instruction for the first type of execution unit such that the instruction is invalidated by the second decode logic.

6. The circuit arrangement of claim 1, further comprising the first and second execution units.

7. The circuit arrangement of claim 6, wherein the designed, verified and tested core comprises a general core, wherein the general core includes an interface through which the first decode logic and the first execution unit are coupled to the general core.

8. The circuit arrangement of claim 7, wherein the first and second execution units are each configured to execute a first instruction, and wherein the first execution unit is configured to execute the first instruction with greater performance than the second execution unit.

9. The circuit arrangement of claim 7, wherein the first and second execution units are each configured to execute a first instruction, wherein the general core includes a design flaw that causes the second execution unit to execute the first instruction with sub-optimal performance, and wherein the first execution unit is configured to execute the first instruction with greater performance than the second execution unit such that the first execution unit corrects for the design flaw in the general core.

10. The circuit arrangement of claim 7, wherein the interface has an indefinite latency, and wherein the first execution unit is configured to return a signal to the general core upon completing an instruction execution.

11. The circuit arrangement of claim 1, further comprising:
    third decode logic associated with a third type of execution unit and configured to receive the instruction concurrently with the first and second decode logic and decode the instruction;

wherein the first and second decode logic each have a higher priority than the third decode logic such that if either of the first and second decode logic respectively decode the instruction as a valid instruction for the first or second type of execution unit, the instruction is executed by the first or second execution unit rather than by a third execution unit of the third type of execution unit.

12. The circuit arrangement of claim 1, further comprising:
a load store unit; and
load store decode logic coupled to the load store unit and configured to decode load and store instructions associated with the first execution unit.

13. The circuit arrangement of claim 1, wherein the first and second decode logic are disposed in a multithreaded processing unit, wherein the instruction is associated with a thread identifier, and wherein the instruction triggers an unimplemented instruction interrupt in response to the instruction being forwarded to the first execution unit and having an invalid thread identifier for the first execution unit.

14. The circuit arrangement of claim 1, wherein the first execution unit comprises an auxiliary execution unit and the second execution unit comprises a fixed point execution unit.

15. The circuit arrangement of claim 1, wherein the first decode logic is disposed external to the designed, verified and tested core.

16. The circuit arrangement of claim 1, wherein respective register files of the first and second execution units have different register architectures, and wherein the first and second rename logic are configured to apply different renaming operations to the instruction based upon the respective register architectures of the respective register files of the first and second execution units.

17. The circuit arrangement of claim 1, further comprising first and second register files respectively associated with the first and second execution units and having different register architectures, and wherein the first rename logic is configured to bypass register renaming for the first execution unit.

18. The circuit arrangement of claim 1, wherein the first rename logic is configured to rename a shared condition register.

19. An integrated circuit device including the circuit arrangement of claim 1.

20. A program product comprising a non-transitory computer readable storage medium and logic definition program code resident on the computer readable storage medium and defining the circuit arrangement of claim 1.

* * * * *